(12) United States Patent
Wolfsberger

(10) Patent No.: US 10,807,350 B2
(45) Date of Patent: Oct. 20, 2020

(54) METHOD AND APPARATUS FOR MANUFACTURING A SANDWICH PART

(71) Applicant: MAGNA STEYR Fahrzeugtechnik AG & Co KG, Graz (AT)

(72) Inventor: Guenter Wolfsberger, Lieboch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 16/299,368

(22) Filed: Mar. 12, 2019

(65) Prior Publication Data

US 2019/0232633 A1 Aug. 1, 2019

Related U.S. Application Data

(62) Division of application No. 14/978,926, filed on Dec. 22, 2015, now Pat. No. 10,308,003.

(30) Foreign Application Priority Data

Dec. 22, 2014 (EP) .................................. 14199862

(51) Int. Cl.
*B32B 37/12* (2006.01)
*B32B 3/12* (2006.01)
(Continued)

(52) U.S. Cl.
CPC .......... *B32B 37/1284* (2013.01); *B29C 70/68* (2013.01); *B32B 3/12* (2013.01);
(Continued)

(58) Field of Classification Search
CPC ............. B32B 37/146; B32B 37/1292; B32B 37/1284; B32B 37/18; B32B 37/20;
(Continued)

(56) References Cited

U.S. PATENT DOCUMENTS

| 3,810,800 A | 5/1974 | Doll |
| 3,878,018 A | 4/1975 | Cospen et al. |

(Continued)

FOREIGN PATENT DOCUMENTS

| CN | 102712141 A | 10/2012 |
| CN | 102774052 A | 11/2012 |

(Continued)

OTHER PUBLICATIONS

Machine translation of DE 102010004865 date uknown.*

(Continued)

*Primary Examiner* — John L Goff, II
(74) *Attorney, Agent, or Firm* — Jordan IP Law, LLC; Todd A. Vaughn

(57) ABSTRACT

A method for producing a sandwich component, and an apparatus for producing a sandwich component. The method includes providing a plurality of webs of material, applying at least one matrix material to an upper side and/or an underside of at least one of the webs of material, wherein applying the at least one matrix material includes applying the at least one matrix material such in different ways to create at least one zone of the sandwich component having mechanical properties that differ from mechanical properties of other parts of the sandwich component, arranging at least one core layer on one of the webs of material, and pressing the webs of material and the at least one core layer to form the sandwich component such that the core layer is arranged between at least two of the webs of material.

9 Claims, 2 Drawing Sheets

(51) Int. Cl.
*B32B 5/00* (2006.01)
*B32B 7/12* (2006.01)
*B32B 37/10* (2006.01)
*B32B 37/00* (2006.01)
*B32B 37/14* (2006.01)
*B32B 37/22* (2006.01)
*B32B 38/00* (2006.01)
*B32B 38/18* (2006.01)
*B29C 70/68* (2006.01)
*B32B 38/08* (2006.01)
*B32B 37/18* (2006.01)

(52) U.S. Cl.
CPC ............... *B32B 5/00* (2013.01); *B32B 7/12* (2013.01); *B32B 37/0053* (2013.01); *B32B 37/10* (2013.01); *B32B 37/146* (2013.01); *B32B 37/18* (2013.01); *B32B 37/22* (2013.01); *B32B 38/0004* (2013.01); *B32B 38/08* (2013.01); *B32B 38/18* (2013.01); *B29C 70/681* (2013.01); *B32B 2038/0076* (2013.01); *B32B 2250/40* (2013.01); *B32B 2305/024* (2013.01); *B32B 2605/00* (2013.01)

(58) Field of Classification Search
CPC ........... B32B 37/22; B32B 2305/024; B32B 38/0004; B32B 38/185; B32B 43/003; B29C 65/522; B29C 66/725; B29C 66/72525; B29C 66/7254; B29C 70/68; B29C 65/741; B29C 65/743; B29C 65/745
USPC ........................................................ 156/251
See application file for complete search history.

(56) References Cited

U.S. PATENT DOCUMENTS

| | | | |
|---|---|---|---|
| 4,061,812 A * | 12/1977 | Gilwee, Jr. ......... | B29D 24/005 428/117 |
| 4,186,044 A | 1/1980 | Bradley et al. | |
| 4,396,738 A | 8/1983 | Powell et al. | |
| 5,087,319 A | 2/1992 | Held | |
| 5,096,526 A | 3/1992 | Engwall | |
| 6,114,050 A | 9/2000 | Westre et al. | |
| 6,511,730 B1 | 1/2003 | Blair et al. | |
| 10,265,937 B2 * | 4/2019 | Wolfsberger ....... | B32B 37/1284 |
| 10,308,003 B2 * | 6/2019 | Wolfsberger ....... | B32B 37/1284 |
| 2005/0126676 A1 * | 6/2005 | Karlsson ............. | B32B 37/24 156/39 |
| 2006/0118238 A1 | 6/2006 | Borazghi | |
| 2007/0062639 A1 | 3/2007 | Chang et al. | |
| 2009/0020216 A1 | 1/2009 | Ruokolainen et al. | |
| 2011/0226321 A1 | 9/2011 | Bohm et al. | |

FOREIGN PATENT DOCUMENTS

| | | |
|---|---|---|
| DE | 10153973 A1 | 5/2003 |
| DE | 102010004865 A1 | 7/2011 |
| DE | 102013013419 A1 | 3/2014 |
| EP | 0420750 A1 | 4/1991 |
| FR | 2171949 A1 | 9/1973 |
| JP | 2005527402 A | 9/2005 |
| JP | 2008137203 A | 6/2008 |
| JP | 2011530444 A | 12/2011 |
| RU | 2303320 C2 | 7/2007 |
| SU | 1838133 A3 | 6/1990 |
| WO | 03082573 A1 | 10/2003 |

OTHER PUBLICATIONS

Machine translation of EP 420750 date unknown.*
Notice of Allowance for U.S. Appl. No. 141978,926, dated Apr. 8, 2019, 8 pages.
Notice of Reasons for Rejection for Japanese Patent Application No. 2015-248908, dated Nov. 29, 2016, 8 pages including 4 pages of English translation.
Office Action for Chinese Patent Application No. 201510463229.3, dated May 10, 2017, 9 pages including 5 pages of English translation.
Notice of Reasons for Rejection for Japanese Patent Application No. 2015-248908, dated Aug. 29, 2017, 6 pages including 3 pages of English translation.
Notice of Preliminary Rejection for Korean Patent Application No. 10-2016-7030587, dated Feb. 1, 2018, 20 pages including 9 pages of English translation.
Office Action for Brazilian Patent Application No. BR112016024986-0, dated Mar. 11, 2020, 4 pages.

* cited by examiner

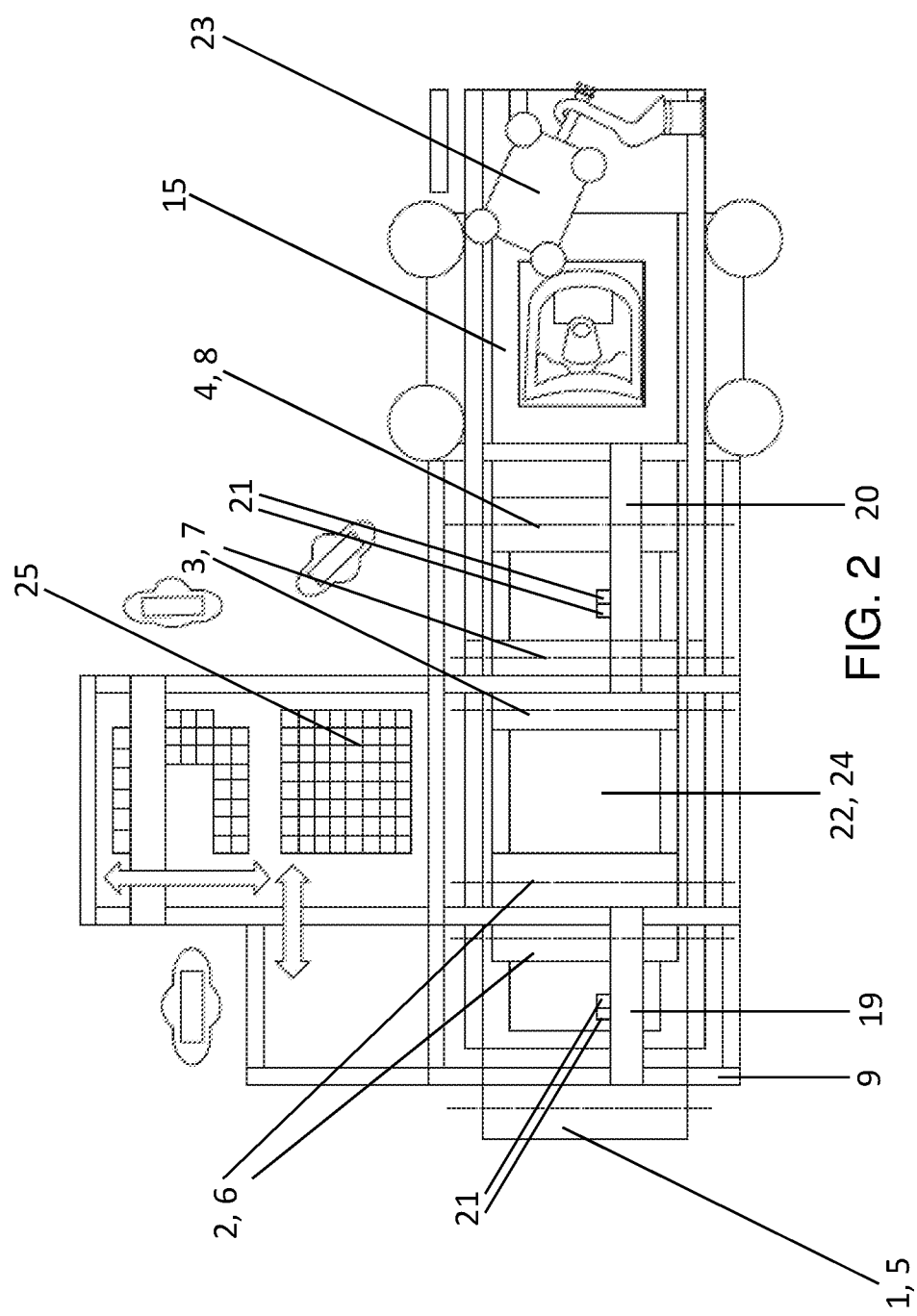

METHOD AND APPARATUS FOR MANUFACTURING A SANDWICH PART

CROSS-REFERENCE TO RELATED APPLICATIONS

The present application is a divisional of U.S. patent application Ser. No. 14/978,926 (filed Dec. 22, 2015), now U.S. Pat. No. 10,308,003, which claims priority 35 U.S.C. § 119 to European Patent Publication No. EP14199862.5 (filed on Dec. 22, 2014), which are each hereby incorporated by reference in their respective entireties.

TECHNICAL FIELD

Embodiments relate to a method for producing a sandwich component, and an apparatus for carrying out this very process.

BACKGROUND

A sandwich component should be generally understood as meaning a component that is made up of layers of the same material or different materials. In the simplest case, sandwich components includes two cover layers: an upper cover layer and a lower cover layer, as well as a core layer, which is arranged between the upper cover layer and the lower cover layer. A connection between the individual layers usually takes place by pressing via a suitable tool, such as, for example, a press.

Such sandwich components are used in many different areas. In recent years, however, their importance particularly as a structural component in the area of lightweight automobile construction has increased enormously. Structural component means in this context that the component dash a three-dimensional shape, it is not necessarily a load carrying component. It can be for example a front flap or a trunk lid or a door of a vehicle.

The related art discloses many different approaches to the production of structural components.

For example, a process for the production of a sandwich component for use as a structural component of a vehicle is described in German Patent Publication No. DE 10 2012 222 376 A1. This involves first arranging an inner cover layer in a tool, arranging a core layer that is porous at least in certain portions on the inner cover layer and in turn arranging an outer cover layer on said core layer. After the described arrangement of the individual layers, a process pressure is produced against the two cover layers and a core pressure is produced in the core layer to equalize the pressure with respect to the process pressure. In this way, the core layer is not subjected to excessive process pressure and does not have to be over dimensioned in terms of its stability.

German Patent Publication No. DE 10 2013 013 419 A1 discloses a continuous production process for producing sandwich components that vary on the visible side, an apparatus for producing the sandwich component and a sandwich component that can be produced thereby. Starting with a cover layer/core layer/cover layer stack, wherein the cover layers consist of layers of fibrous thermoplastic material, the process presented in this document for producing the sandwich component comprises a first step of heating the sandwich arrangement, wherein the sandwich arrangement is heated until the thermoplastic material of the layer of fibrous material at least begins to flow. The heating takes place in a heating tool, for example a heating press. When the heating press is used, the pressing pressure produced has the effect that the layers of fibrous thermoplastic material adhere to the honeycomb core (core layer). In the next process step, a decorative layer with a foam layer is arranged on the heated sandwich arrangement in such a way that the foam layer is facing the cover layer. The viscous thermoplastic of the cover layer brings about adhesive bonding of the foam layer to the sandwich arrangement. After that, the surface of the decorative layer is adapted via a form template to the surface structure that the finished sandwich arrangement should have. For this purpose, one or more form template(s) is/are arranged on one or both basic could surfaces of the compression molding tool. The final step of the process is represented by the cooled compression molding via a molding press.

Similarly, European Patent Publication No. UP 1 897 680 A1 describes a process for producing a fiber-reinforced sandwich component with a honeycomb core, wherein the honeycomb core is only closed on one side via a cover layer, but the honeycombs of the honeycomb layer are closed on both sides. The process in that case comprises the steps of: producing a lay-up comprising the honeycomb core, as well as, at least on one side of the honeycomb core, arranged from the inside to the outside, a curable adhesive layer, a barrier layer and a fiber layer; confining the lay-up in a gas-tight space; producing a vacuum in this gas-tight space; complete or partial curing of the adhesive layer between the honeycomb core and the barrier layer under this vacuum, so that the honeycomb cells are at least partly evacuated before they are closed by the barrier layer; and after complete or partial curing of the adhesive layer, infusing the fiber layer under vacuum with a matrix material, and curing the matrix material under vacuum.

SUMMARY

Embodiments relate to an alternative method for producing a sandwich component, and an apparatus for carrying out this very method.

In accordance with embodiments, a method for producing a sandwich component comprises: providing a plurality of webs of material; applying at least one matrix material to an upper side and/or an underside of at least one of the webs of material, wherein the matrix material is applied in different ways to at least two of the webs of material and/or the matrix material is applied in different ways to at least one of the webs of material along the upper side and/or the underside thereof; arranging at least one core layer on one of the webs of material; and pressing the webs of material and the core layer to form the sandwich component such that the core layer is arranged between at least two of the webs of material.

In accordance with embodiments, a sandwich component produced by the method comprises: at least two layers of webs of material; and at least one core layer arranged between at least two of the webs of material.

In accordance with embodiments, the webs of material may be produced from fibrous material, and may be thin in comparison with the core layer. The fibers used thereby are natural fibers, such as, for example, hemp fibers, bamboo fibers, cellulose-based fibers, etc., and/or organic and inorganic man-made fibers, such as, for example, polyamide fibers, glass fibers, carbon fibers, etc.

In accordance with embodiments, the fibrous material is consequently made up of fibers that have been processed into woven, nonwoven or knitted fabrics, mats, meshes, etc., wherein these formations have been further processed into a basic matrix suitable for requirements, to form composite materials.

In accordance with embodiments, the fibers of two different webs of material may have a different orientation, especially the main direction of fibers of two different layers may have an angle between 0 and 180 degree or 180 degree to each other.

In accordance with embodiments, the webs of material (fibrous material) may be pre-treated, wherein all manners of pre-treatment that are familiar to a person skilled in the art, such as, for example, priming, impregnating, coating, etc., come into consideration.

In accordance with embodiments, the individual webs of material used may differ from one another in their (basic) composition and design.

Advantageously, the webs of material are formed so as to be permeable to the matrix material.

In accordance with embodiments, the individual webs of material are formed in the manner of layers, that is to say that they are made up of at least two individual layers, wherein at least one of the individual layers is a fibrous material.

In accordance with embodiments, individual layers of non-fibrous material may be composed of plastic, and are formed in the manner of films.

In accordance with embodiments, on the webs of material provided, at least one matrix material is applied to the upper side and/or the underside of at least one of the webs of material, wherein matrix material is applied in different ways to at least two of the webs of material and/or matrix material is applied in different ways to at least one of the webs of material along the surface area thereof.

Advantageously, by applying matrix material in different ways to at least one of the webs of material along the surface area thereof, it is possible to build zones, areas or regions with mechanical properties that differ from the properties of other parts of the sandwich component. Especially it is possible to build a zone, area or region that is more easily deformable and serves for a better protection of pedestrians. It is also possible to have a plurality of zones, areas or regions, such as, for example, at least two, three or four, that all have different mechanical properties than the others.

In accordance with embodiments, the phrase "in different ways" should be understood as meaning applying matrix material by applying a different amount and/or a different type of matrix material to the webs of material.

In accordance with embodiments, the matrix material is consequently advantageously applied homogeneously and/or in-homogeneously to one or more webs of material.

In accordance with embodiments, the matrix material may be of a thermoplastic and/or thermosetting polymer. The matrix material may be a resin, particularly preferably a synthetic resin (for example polyurethane). The matrix material is formed in an adhesive manner and has for example the main components resin and catalyst, or base and catalyst.

In accordance with embodiments, in order to influence the properties of the matrix material with respect to diverse requirements, such as, for example, strength or elasticity, additional components and/or materials, such as, for example, fibers, may be advantageously admixed with the matrix material. This may involve short and/or long fibers being admixed homogeneously or in-homogeneously with the matrix material, in order thereby to apply matrix material to the webs of material in different ways, i.e. Homogeneously and/or in-homogeneously. Different component properties, such as, for example, an in-homogeneous and/or homogeneous zone stiffness over the surface area of the web of material, are thus likewise produced. This results in a sandwich component with a homogeneous and/or inhomogeneous layer structure both over the surface area of the component and over the layer structure of the layers. Especially it is possible to build zones, areas or regions with different mechanical properties by admixing fibers of different type and/or length to different zones, areas or regions of the component.

In accordance with embodiments, the webs of material may be stored on holding rollers and are unwound from the holding rollers as and when required via at least one unwinding unit. The webs of material may be guided substantially horizontally, parallel to one another and over one another and/or substantially vertically next to one another and/or at any desired angle in relation to one another.

In accordance with embodiments, the webs of material may be already in the form of ready-made individual layers, corresponding to the contour of the sandwich component.

In accordance with embodiments, the guidance of the webs of material may take place by way of a continuous assembly line moved in the direction of a press.

In accordance with embodiments, with respect to their beginning, the webs of material may be guided horizontally and/or vertically at a distance in the direction of the press.

In accordance with embodiments, during the time period in which the webs of material are being guided from the holding rollers in the direction of the press, the method blocks of applying at least one matrix material to the upper side and/or the underside of at least one of the webs of material, wherein matrix material is applied in different ways to at least two of the webs of material and/or matrix material is applied in different ways to at least one of the webs of material along the surface area thereof, arranging the core layer on at least one of the webs of material and pressing the webs of material and the core layer in a press proceed in substantially this very sequence.

Consequently, at the beginning of the process there is an application of at least one matrix material to the upper side and/or the underside of at least one of the webs of material, wherein matrix material is applied in different ways to at least two of the webs of material and/or matrix material is applied in different ways to at least one of the webs of material along the surface area thereof.

In accordance with embodiments, the application of the matrix material may take place on the upper side or the underside of the webs of material, but according to requirements, may also take place on the upper side and the underside of the webs of material simultaneously. The latter brings about a time saving in the case of a structure comprising a number of webs of material.

In accordance with embodiments, the application of the matrix material to the individual webs of material may take place via spraying application and/or a dipping process and/or rolling application (application via rollers).

In accordance with embodiments, the application unit may comprise a spraying unit, wherein the spraying unit may have at least two spray heads, and a matrix material having various properties, such as, for example, viscosity, thixotropes, composition etc., may be applied to the webs of material in a simple manner. This allows sandwich components with partially different properties, with respect, for example, to zone stiffness or surface quality, to be produced.

In accordance with embodiments, because of the individual application (in various ways) of the matrix material to the individual webs of material, as well as the adaptation of the properties of the matrix material (for example, viscosity, thixotropes, amount) to the respective material of the webs of material, only a comparatively thin matrix application is required in each case, resulting in an optimization in terms of weight and function.

In accordance with embodiments, at least one core layer is arranged on at least one of the webs of material. In the finished component, this core layer, for example, brings about an advantageous stiffening of this very sandwich component.

In accordance with embodiments, the core layer is advantageously configured in the manner of a honeycomb. Other structures and forms of the core layer, such as, for example, a wave-like form, may alternatively be used.

In accordance with embodiments, the core layer may be formed from a lightweight material, such as, for example, a polymer (foam, plastic, rubber, etc.), a cellulose-based material (paper, wood, card, etc.), a composite material or else a metal.

In accordance with embodiments, the core layer may be formed in a layer-like manner, such as, for example, by a plurality of individual core layers arranged over one another. Here, the individual core layers may be formed differently from one another. In particular, honeycomb cores with a differing honeycomb form, honeycomb size, honeycomb alignment, differing cell wall geometries and/or material of the honeycomb and/or individual core layers, may be stacked and connected to one another. This is especially advantageous because, as a result, the later finished component can be partially provided with different functional properties or component properties. On one hand, the component is intended to have a specific required strength and stiffness, but on the other hand it is intended to comprise soft, easily deformable zones, areas or regions at certain locations, as is advantageous, for example, in the motor vehicle sector for avoiding injuries in the event of collisions with pedestrians.

In accordance with embodiments, the core layer may be formed so as to be permeable to the matrix material, or at least semi-permeable.

In accordance with embodiments, the webs of material that are guided with respect to their beginning horizontally offset, in parallel and over one another and/or vertically next to one another and the at least one core layer are pressed to form the sandwich component. The pressing takes place via a press, such as, for example, by a wet-pressing process.

In accordance with embodiments, a separation of the sandwich component from the unpressed webs of material additionally takes place in the course of the pressing of the webs of material and the core layer to form a sandwich component. This brings about the advantage that two method blocks may be performed in a single operation, and consequently, a savings in time is achieved using the method.

In accordance with embodiments, an apparatus for carrying out the method for producing a sandwich component may comprises the following: at least one unwinding unit for unwinding webs of material from holding rollers; at least one application unit for applying at least one matrix material to the upper side and/or the underside of at least one of the webs of material, wherein matrix material is applied in different ways to at least two of the webs of material and/or matrix material is applied in different ways to at least one of the webs of material along the surface area thereof; at least a first gripping unit for arranging at least one core layer on at least one of the webs of material; and at least one press for pressing the webs of material guided over one another and the core layer to form the sandwich component.

In accordance with embodiments, the press for pressing the webs of material and the core layer has a cutting device in the region of an upper pressing plate and/or in the region of a lower pressing plate. The arrangement of the cutting device in the region of the upper pressing plate and/or the lower pressing plate achieves the effect of simultaneous pressing of the webs of material and the core layer to form a sandwich component and a separation of this very component. Two method blocks are thus combined in a single operation.

In accordance with embodiments, the press may also be of a heatable configuration.

In accordance with embodiments, the apparatus may also have at least one unwinding unit and, under some circumstances, also a continuous assembly line, via which the webs of material are guided substantially horizontally parallel to one another and over one another and/or substantially vertically next to one another in the direction of the press.

In accordance with embodiments, the holding rollers of the webs of material are arranged horizontally and/or vertically at a distance from one another. As a result, it is possible to guide the webs of material with respect to their beginning horizontally and/or vertically at a distance in the direction of the press.

Via the at least one application unit, at least one matrix material is applied to the upper side and/or the underside of at least one of the webs of material, wherein matrix material is applied in different ways to at least two of the webs of material and/or matrix material is applied in different ways to at least one of the webs of material along the surface area thereof. The application unit may be a spraying unit, and/or a dipping unit, and/or a rolling unit.

In accordance with embodiments, the application unit is a spraying unit with at least a second spray head, wherein the second spray head applies matrix material in different ways by applying a different amount and/or a different type of matrix material. Application via spraying application using a spraying unit is particularly advantageous if additional fibrous material, such as, for example, short-fiber material, is admixed with the matrix material.

DRAWINGS

Embodiments will be illustrated by way of example in the drawings and explained in the description below.

FIG. 2 illustrates a top view of an apparatus for carrying out a method for producing a sandwich component, in accordance with embodiments.

DESCRIPTION

Figure 1:
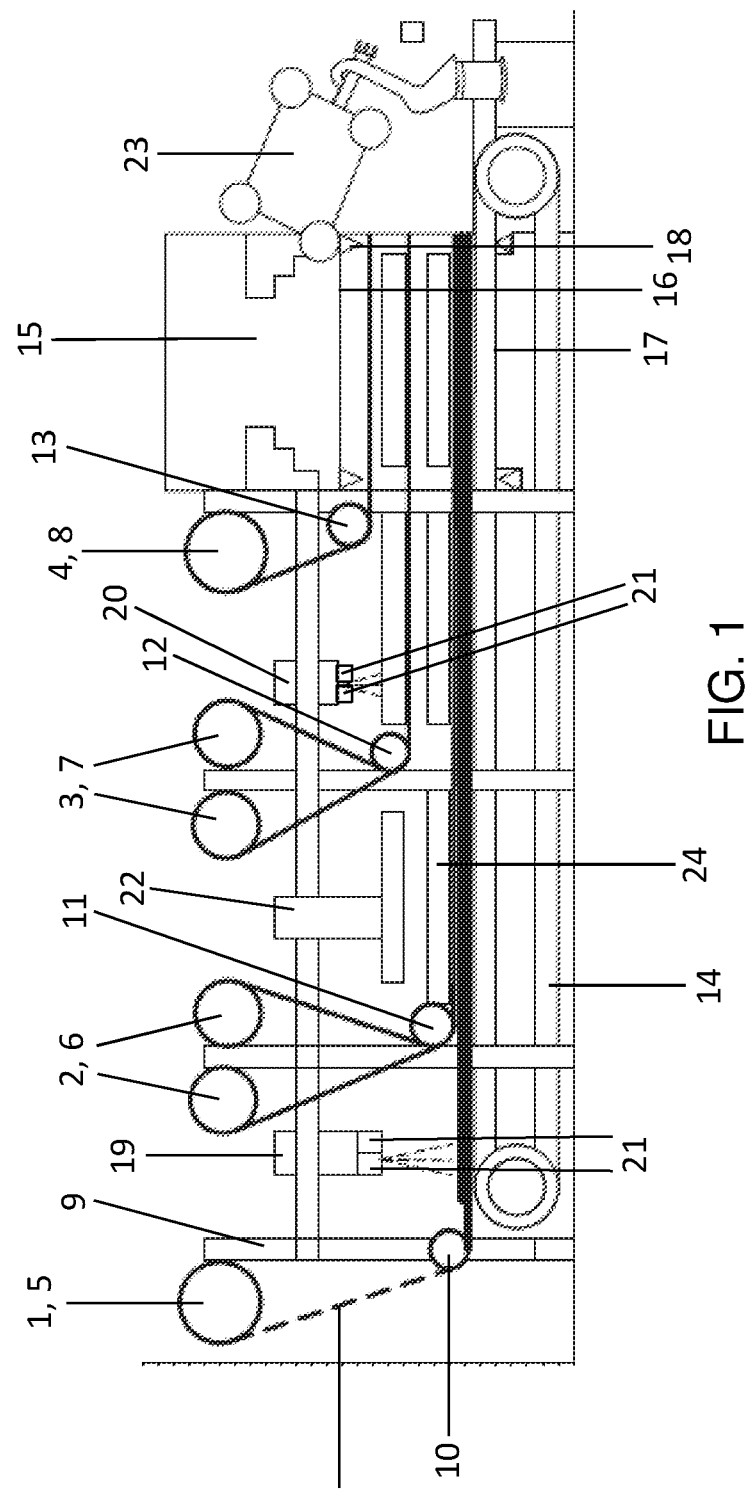
FIG. 1 illustrates a side view of an apparatus for carrying out a method for producing a sandwich component, in accordance with embodiments.

FIGS. 1 and 2 illustrate schematic representations of an apparatus for carrying out a method for producing a sandwich component, in accordance with embodiments.

FIG. 1 illustrates a side view of an apparatus for carrying out a method for producing a sandwich component, in accordance with embodiments, the apparatus having a plurality, such as, for example, six holding rollers 5, 6, 7, 8 for a plurality, such as, for example, four webs of material 1, 2, 3, 4, a plurality, such as, for example, four unwinding units 10, 11, 12, 13, a continuous assembly line 14, application units 19, 20, gripping units 22, 23, and a press 15 with a cutting device 18. The continuous assembly line 14 is to perform a movement in the horizontal direction towards the press 15.

Via the apparatus illustrated by way of example in FIG. 1, a sandwich component may be produced by the method in accordance with embodiments. The sandwich component thus produced may have a core layer 24 and a plurality, such as, for example, four webs of material 1, 2, 3, 4. The webs of material include a first web of material 1, a second web of material 2, a third web of material 3, and a fourth web of material 4, wherein the second web of material 2 and the third web of material 3 are of a double-layered configuration. The materials of the individual webs of material 1, 2, 3, 4 may be the same, or alternatively, may differ.

A cage-like framework 9 may be arranged over/around the apparatus and may serve as a mounting for the holding rollers of the webs of material 5, 6, 7, 8. The holding rollers of the webs of material 5, 6, 7, 8 are arranged horizontally at a distance from one another over the respective unwinding unit 10, 11, 12, 13 and the continuous assembly line 14.

The first web of material 1 is assigned a first unwinding unit 10, the second web of material 2 is assigned a second unwinding unit 11, the third web of material 3 is assigned a third unwinding unit 12, and the fourth web of material 4 is assigned a fourth unwinding unit 13. The unwinding units 10, 11, 12, 13 are similarly arranged on the cage-like framework 9.

The horizontally offset arrangement of the holding rollers of the webs of material 5, 6, 7, 8 along the apparatus makes it possible to guide the webs of material 1, 2, 3, 4 with respect to their beginning horizontally at a distance in the direction of a press 15 and to arrange between their beginnings individual further components of the apparatus, such as, for example, application units 19, 20 or gripping units 22.

The first web of material 1 is guided horizontally over the continuous assembly line 14 by way of a first unwinding unit 10. The second web of material 2 is guided horizontally over the first web of material 1 via the second unwinding unit 11. The second web of material 2 thereby runs substantially parallel to the first web of material 1. The third web of material 3 is guided horizontally over the second web of material 2 via the third unwinding unit 12. The third web of material 3 thereby runs substantially parallel to the first web of material 1 and the second web of material 2. The fourth web of material 4 is guided horizontally over the third web of material 3 via the fourth unwinding unit 13. The fourth web of material 4 thereby runs substantially parallel to the first web of material 1, the second web of material 2 and the third web of material 3.

A first application unit 19 is arranged on the cage-like framework 9 between the holding roller of the first web of material 5 and the two holding rollers of the second web of material 6 (the second web of material 2 is of a double-layered configuration). The first application unit 19 is configured as a spraying unit and has two spray heads 21. According to requirements, only one spray had 21 or both spray heads 21 can be used when applying a matrix material. This first application unit 19 applies the matrix material to the upper side of the first web of material 1. The second web of material 2 is guided over the first web of material 1 whetted with matrix material.

A first gripping unit 22 is arranged on the cage-like framework 9 between the two holding rollers of the second web of material 6 and the two holding rollers of the third web of material 7 (the second web of material 2 and the third web of material 3 are of a double-layered configuration). The first gripping unit 22 places a core layer 24 onto the upper side of the second web of material 2. The third web of material 3 is guided over the core layer 24.

A second application unit 20 is arranged on the cage-like framework 9 between the two holding rollers of the third web of material 7 (the third web of material 3 is of a double-layered configuration) and the holding roller of the fourth web of material 8. The second application unit 20 is similarly configured as a spraying unit and similarly has two spray heads 21. Here, too, according to requirements, both spray heads 21 can be used when applying the matrix material, or just one. This second application unit 20 applies the matrix material to the upper side of the third web of material 3. The fourth web of material 4 is guided over the third web of material 3 whetted with matrix material.

The sandwich component then obtained comprises the following layers (from bottom to top): the first web of material 1, matrix material, the second web of material 2, the core layer 24, the third web of material 3, matrix material, and the fourth web of material 4.

With the structure of the apparatus given by way of example, the fourth web of material 4 consequently forms the termination of the sandwich component.

The stacked sandwich component is fed to the press 15 by way of the continuous assembly line 14. In the press 15, the individual layers (webs of material 1, 2, 3, 4 and core layer 24) are pressed to form a finished sandwich component. The press 15 shown has a cutting device 18 on an upper pressing plate 16 and on a lower pressing plate 17. Thus, in the course of the pressing operation, the completed sandwich component is separated from the raw materials (webs of material 1, 2, 3, 4).

The second gripping unit 23 removes the finished sandwich component from the press 15.

FIG. 2 illustrates the apparatus in a top view. The same parts are provided with the same reference numerals. In addition, intermediate storage places 25 for the core layer(s) 24 are also shown in this representation. The first gripping unit 22 grips a core layer 24 from these intermediate storage places 25 and positions it on the second web of material 2.

The term "coupled" or "connected" may be used herein to refer to any type of relationship, direct or indirect, between the components in question, and may apply to electrical, mechanical, fluid, optical, electromagnetic, electro mechanical or other connections. In addition, the terms "first," "second, etc. Are used herein only to facilitate discussion, and carry no particular temporal or chronological significance unless other-wise indicated.

This written description uses examples to disclose the invention, including the preferred embodiments, and also to enable any person skilled in the art to practice the invention, including making and using any devices or systems and performing any incorporated methods. The patent able scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 First web of material
2 Second web of material

3 Third web of material
4 Fourth web of material
5 Holding roller(s) of the first web of material
6 Holding roller(s) of the second web of material
7 Holding roller(s) of the third web of material
8 Holding roller(s) of the fourth web of material
9 Framework
10 First unwinding unit
11 Second unwinding unit
12 Third unwinding unit
13 Fourth unwinding unit
14 Continuous assembly line
15 Press
16 Upper pressing plate
17 Lower pressing plate
18 Cutting device
19 First application unit
20 Second application unit
21 Spray head
22 First gripping unit
23 Second gripping unit
24 Core layer
25 Intermediate storage places

What is claimed is:

1. A method for producing a sandwich component, comprising:
    providing a plurality of webs of material that are each composed of fibrous material;
    applying, by a spraying application via a spraying unit, at least one matrix material to an upper side and an underside of at least one web of the webs of material, applying at least one matrix material by applying the at least one matrix material in different ways to at least two of the webs of material, wherein the application of the at least one matrix material takes place in different ways by applying a different amount and/or a different type of matrix material, so that at least one zone of the sandwich component has mechanical properties that differ from mechanical properties of other zones of the sandwich component;
    arranging at least one core layer on one web of the webs of material; and
    pressing, via a press, the webs of material and the at least one core layer to form a completed sandwich component, while simultaneously separating the completed sandwich component from unpressed webs of material via the press, such that the at least one core layer is arranged between at least two webs of the webs of material.

2. The method of claim 1, wherein the at least one core layer comprises a honeycomb core layer.

3. The method of claim 1, wherein the at least one matrix material is admixed with fibres.

4. The method of claim 1, wherein providing the plurality of webs of material comprises unwinding the webs of material from separate holding rollers.

5. The method of claim 1, wherein providing the plurality of webs of material comprises unwinding the webs of material from separate holding rollers via at least one unwinding unit.

6. The method of claim 1, wherein the plurality of webs of material are guided with respect to their beginning horizontally at a distance and/or vertically at a distance in the direction of the press.

7. The method of claim 1, wherein providing the plurality of webs of material comprises guiding the webs of material substantially horizontally, parallel to one another and over one another and/or substantially vertically next to one another in a direction of the press to press the webs of material and the at least one core layer.

8. The method of claim 7, wherein pressing the plurality of webs of material and the at least one core layer comprises a wet-pressing process.

9. A method for producing a sandwich component, comprising:
    providing a plurality of webs of material that are each composed of fibrous material;
    applying, via a spraying unit, a matrix material to an upper side and an underside of at least one web of the webs of material, wherein applying the matrix material includes applying the matrix material in different ways by applying a different amount and/or a different type of matrix material, to create at least one zone of the sandwich component having mechanical properties that differ from mechanical properties of other zones of the sandwich component;
    arranging a core layer on one web of the webs of material; and
    pressing the webs of material and the core layer, via a press, to form a completed sandwich component, while simultaneously separating the completed sandwich component from unpressed webs of material via the press, such that the core layer is arranged between at least two webs of the webs of material.

* * * * *